US008837775B2

(12) United States Patent
Nakasu et al.

(10) Patent No.: US 8,837,775 B2
(45) Date of Patent: Sep. 16, 2014

(54) APPARATUS AND METHOD FOR RECOGNIZING GESTURE, AND NON-TRANSITORY COMPUTER READABLE MEDIUM THEREOF

(75) Inventors: Toshiaki Nakasu, Tokyo (JP); Hidetaka Ohira, Tokyo (JP); Tsukasa Ike, Tokyo (JP); Yojiro Tonouchi, Tokyo (JP); Ryuzo Okada, Kanagawa-ken (JP); Takahiro Arai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 272 days.

(21) Appl. No.: 13/421,711

(22) Filed: Mar. 15, 2012

(65) Prior Publication Data

US 2013/0034265 A1 Feb. 7, 2013

(30) Foreign Application Priority Data

Aug. 5, 2011 (JP) ................. P2011-172410

(51) Int. Cl.
*G06K 9/62* (2006.01)
*G06K 9/00* (2006.01)

(52) U.S. Cl.
CPC ........ *G06K 9/00208* (2013.01); *G06K 9/00355* (2013.01); *G06K 9/6201* (2013.01)
USPC ....................................................... 382/103

(58) Field of Classification Search
None
See application file for complete search history.

(56) References Cited

U.S. PATENT DOCUMENTS

| 2008/0018595 A1* | 1/2008 | Hildreth et al. ............... 345/156 |
| 2009/0228841 A1* | 9/2009 | Hildreth ........................ 715/863 |
| 2011/0221974 A1* | 9/2011 | Stern et al. .................... 348/734 |
| 2011/0289456 A1* | 11/2011 | Reville et al. ................. 715/830 |

FOREIGN PATENT DOCUMENTS

| JP | 11-085369 | 3/1999 |
| JP | 2010-182014 | 8/2010 |
| JP | 2011-070597 | 4/2011 |

OTHER PUBLICATIONS

Hand Gesture Recognition using Combined Features of Location, Angle and Velocity. Ho-Sub Yoon, Jung Soh, Younglae J. Bae, Hyun Seung Yang. 2001.*

* cited by examiner

*Primary Examiner* — Stephen R Koziol
*Assistant Examiner* — Delomia Gilliard
(74) *Attorney, Agent, or Firm* — Finnegan, Henderson, Farabow, Garrett & Dunner, L.L.P.

(57) ABSTRACT

According to one embodiment, a time series information acquisition unit acquires time series information of a position or a size of a specific part of a user's body. An operation segment detection unit detects a movement direction of the specific part from the time series information, and detects a plurality of operation segments each segmented by two of a start point, a turning point and an end point of the movement direction. A recognition unit specifies a first operation segment to be recognized and a second operation segment following the first operation segment among the plurality of operation segments, and recognizes a motion of the specific part in the first operation segment by using a first feature extracted from the time series information of the first operation segment and a second feature extracted from the time series information of the second operation segment.

8 Claims, 14 Drawing Sheets

APPARATUS AND METHOD FOR RECOGNIZING GESTURE, AND NON-TRANSITORY COMPUTER READABLE MEDIUM THEREOF

CROSS-REFERENCE TO RELATED APPLICATION

This application is based upon and claims the benefit of priority from Japanese Patent Application No. 2011-172410, filed on Aug. 5, 2011; the entire contents of which are incorporated herein by reference.

FIELD

Embodiments described herein relate generally to an apparatus and a method for recognizing a gesture, and a non-transitory computer readable medium thereof.

BACKGROUND

By recognizing a motion of a user's hand, a gesture recognition apparatus for desirably generating a command related to the motion is used. Some gesture recognition apparatus recognizes "forward operation" which the user's hand is moving along a predetermined direction, such as top and bottom or right and left. In this gesture recognition apparatus, when a velocity (movement velocity) by which the user's hand is moving is above a threshold, and when another forward operation was not detected in the past predetermined period, an input of the forward operation is recognized.

However, immediately before a forward operation, the user's hand is slightly moving along a direction opposite to that of the forward operation, i.e., this motion is called "previous swing". Accordingly, in the conventional technique, when a movement velocity of the user's hand as a previous swing is above a threshold, the previous swing is erroneously recognized as the forward operation.

DETAILED DESCRIPTION

Figure 1:
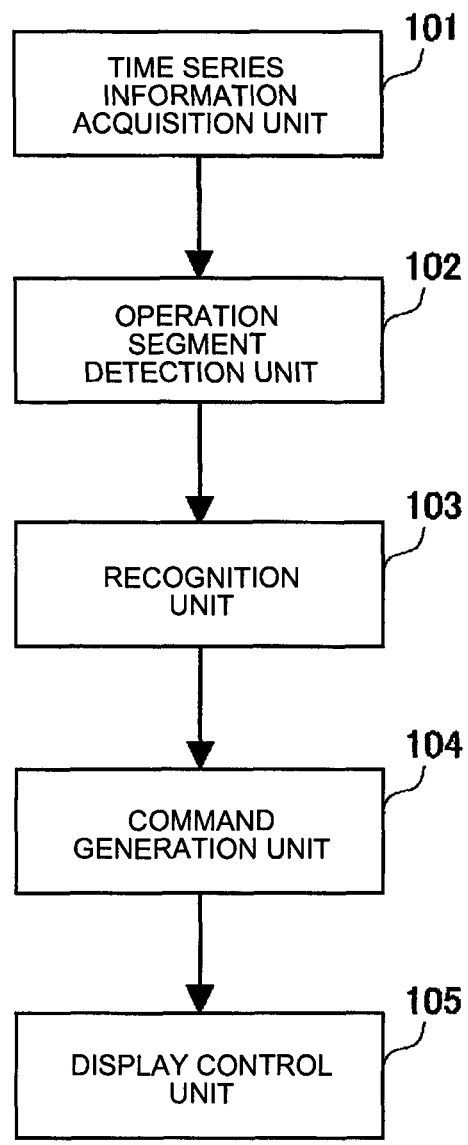
FIG. 1 is a block diagram of a gesture recognition apparatus according to the first embodiment.

According to one embodiment, a gesture recognition apparatus includes a time series information acquisition unit, an operation segment detection unit, and a recognition unit. The time series information acquisition unit is configured to acquire time series information related to a position or a size of a specific part of a user's body or an object. The operation segment detection unit is configured to detect a movement direction of the specific part from the time series information, and to detect a plurality of operation segments each segmented by two of a start point, a turning point and an end point of the movement direction in time series order. The recognition unit is configured to specify a first operation segment to be recognized and a second operation segment following the first operation segment among the plurality of operation segments, and to recognize a motion of the specific part in the first operation segment by using a first feature extracted from the time series information of the first operation segment and a second feature extracted from the time series information of the second operation segment.

Various embodiments will be described hereinafter with reference to the accompanying drawings.

The First Embodiment

A gesture recognition apparatus of the first embodiment operates a screen display by motion of a user's hand, and has a function to transfer the screen toward a direction corresponding to the user's forward operation. For example, in a television set (loading a camera) built-in the gesture recognition apparatus, a position of an object (a target to be controlled by forward operation) displayed on the television set is transferred by recognizing the user's forward operation. Here, "forward operation" is a hand motion along a predetermined direction such as top and bottom, right and left, front and rear, and combination thereof. As the user's hand motion, except for the forward operation along a direction for the user to transfer the screen, "previous swing" occurred immediately before a forward operation as a motion along a direction opposite to that of the forward operation, and "return swing" to return the hand toward an original position thereof after the forward operation, exist.

In the gesture recognition apparatus of the first embodiment, on the assumption that a velocity of hand's movement as a forward operation is quicker than a velocity of hand's movement as a previous swing or a return swing, the forward operation is detected. Concretely, by acquiring time series information related to a position of the user's hand, a movement direction and a movement velocity of the hand are detected from the time series information. Then, as to a start point of the time series information, a turning point at which the movement direction turns, and an end position of the time series information, a plurality of operation segments segmented by combination of two of the start point, the turning point and the end point is detected. Concretely, a first operation segment as a recognition target, a second operation segment following the first operation segment, and a third operation segment preceding the first operation segment, are specified. If a movement velocity (first feature) of the hand in the first operation segment is quicker (higher) than each movement velocity (second feature, third feature) of the hand in the second operation segment and the third operation segment, the hand movement corresponding to the first operation segment is recognized as a forward operation.

As mentioned-above, in the gesture recognition apparatus of the first embodiment, by using time series information related to hand's position in not only an operation segment of a recognition target but also two operation segments before and after the operation segment, the forward operation is recognized. As a result, it is prevented that the user's previous swing and return swing are erroneously recognized as the forward operation.

(Entire Block Component)

FIG. 1 is a block diagram of the gesture recognition apparatus according to the first embodiment. The gesture recognition apparatus includes a time series information acquisition unit 101, an operation segment detection unit 102, a recognition unit 103, a command generation unit 104, and a display control unit 105.

The time series information acquisition unit 101 acquires time series information related to a position of a user's hand. The operation segment detection unit 102 detects a movement direction of the hand from the time series information, and detects a plurality of operation segments segmented by two of a start point of the time series information, a turning point at which the movement direction turns, and an end position of the time series information. The recognition unit 103 specifies a first operation segment as a recognition target, a second operation segment following the first operation segment, and a third operation segment preceding the first operation segment from the plurality of operation segments. Furthermore, the if a movement velocity of the hand in the first operation segment is quicker than each movement velocity of the hand in the second operation segment and the third operation segment, the recognition unit 103 recognizes the hand movement corresponding to the first operation segment as a forward operation. The command generation unit 104 generates a command based on the recognition result. The display unit 105 displays a shape of a control target by the command.

(Hardware Component)

Figure 2:
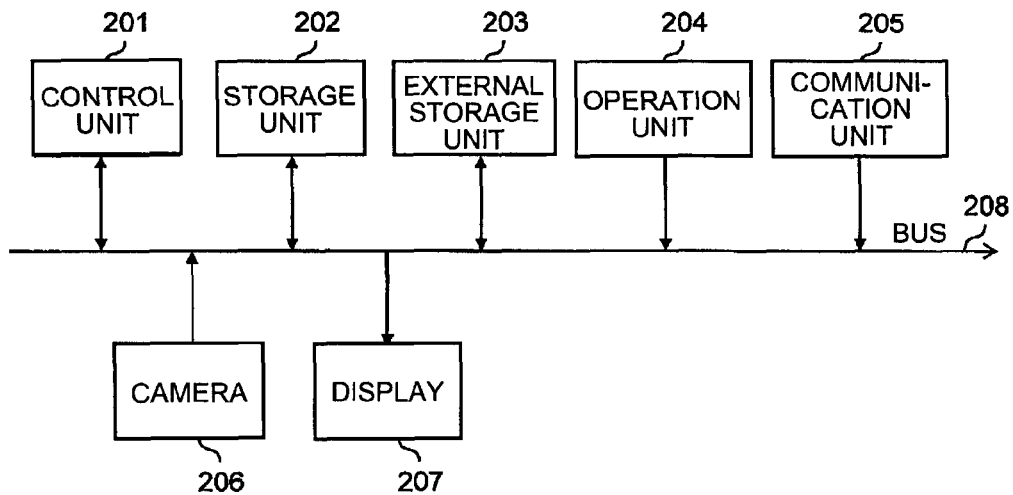
FIG. 2 is a hardware component of the gesture recognition apparatus according to the first embodiment.

The gesture recognition apparatus of the first embodiment is composed by a hardware utilizing a regular computer. As shown in FIG. 2, a control unit 201 such as CPU (Central Processing Unit) controls all the apparatus. A storage unit 202 such as ROM (Read Only Memory) or RAM (Random Access Memory) stores various data and programs. An external storage unit 203 such as HDD (Hard Disk Drive) or CD (Compact Disk) drive device stores various data and programs. An operation unit 204 such as a key board or a mouse accepts a user's indication input. A communication unit 205 controls communication with an external device. A camera 206 acquires a video. A display 207 displays the video. A bus 208 connects above-mentioned units.

In this hardware component, by executing various programs stored in the storage unit 202 (such as ROM) or the external storage unit 203 by the control unit 201, following functions are realized.

(The Time Series Information Acquisition Unit)

The time series information acquisition unit 101 acquires time series information related to a position of a user's hand. The time series information can be acquired from an image captured by an imaging device (such as an image sensor) of the camera 206, by using a method disclosed in JP-A 2010-182014 (Kokai). The position of the hand may be the center of gravity of a hand area acquired by the imaging device, which is represented as not only x-y coordinate on the captured image but also depth information estimated by a distance sensor or a plurality of imaging devices. The time series information is acquired for each frame of the captured image. The start point is a position which the hand is first detected, and the end point is a position which the hand is last detected or the latest position of the hand detected at the present time. For example, if a position of the user's hand is represented as x-y coordinate on the image, the time series information acquisition unit 101 acquires a position $(x_i, y_i)$ of i-th frame and an acquisition time $T_i$. The acquisition time $T_i$ is represented as a passed time, the number of clocks passed, or the number of frames passed, from activation time of the gesture recognition apparatus or start time to acquire the time series information (by the time series information acquisition unit 101).

Moreover, the time series information related to the hand position may be directly acquired from not the camera 206 but the external storage unit 203 or an external device connected via the communication unit 205.

(The Operation Segment Detection Unit)

The operation segment detection unit 102 detects a movement direction, a movement velocity and a movement distance of the hand from the time series information, and detects a plurality of operation segments segmented by two of a start point of the time series information, a turning point at which the movement direction turns, and an end position of the time series information.

The movement direction of the hand is a direction which the hand position (represented by the time series information) changes. For example, when the gesture recognition apparatus recognizes a forward operation along right and left (x-axis direction), the gesture recognition apparatus calculates a difference $(x_i - x_{i-1})$ of x-coordinate between two adjacent frames. Then, when the difference is a positive value, the movement direction is right on condition that a positive direction along x-axis is right direction. When the difference is a negative value, the movement direction is left. A movement velocity of the hand is calculated as a differential value (difference between two frames) of the hand position (acquired as the time series information). Briefly, if acquisition time of $x_i$ and $x_{i-1}$ are $T_i$ and $T_{i-1}$ respectively, the movement velocity is calculated as $|(x_i - x_{i-1})/(T_i - T_{i-1})|$. The movement distance is calculated as Euclidean distance between coordinates of each frame.

The operation segment detection unit 102 detects a plurality of operation segments segmented by two of a start point of the time series information, a turning point at which the movement direction turns, and an end position of the time series information. For example, when a user performs a forward operation "from right to left" by hand, by thinking about a previous swing before and a return swing after the forward operation, the moving direction of the hand is "from left to right", "from right to left", and "from left to right". Here, the operation segment detection unit 102 detects each motion of "from left (start point) to right (turning point)", "from right (turning point) to left (turning point)" and "from left (turning point) to right (end point)" as the operation segment. Moreover, the operation segment detection unit 102 can detect the operation segment by a position where the hand movement has stopped as the end point or the start point. Whether the hand movement has stopped is decided by observing the hand's movement distance over frames of predetermined number.

The operation segment detection unit 102 acquires an acquisition time of each operation segment. Here, the acquisition time represents a time of an end point of each operation segment, which is calculated from acquisition time $T_i$ acquired by the time series information acquisition unit 101. The operation segment detection unit 102 may detect the operation segment by batch processing or real-time processing.

Figure 3:
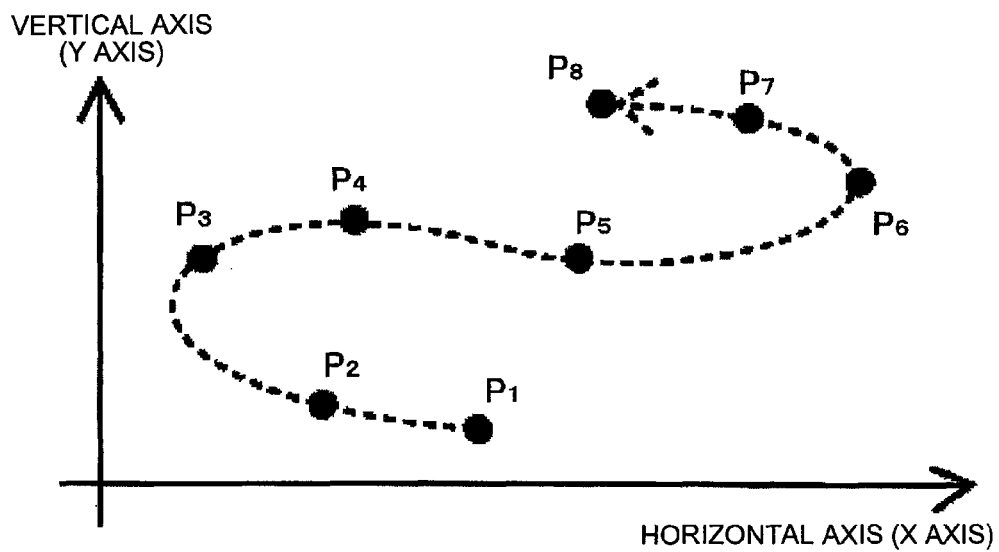
FIG. 3 is one example to explain operation of an operation segment detection unit in FIG. 1.

By referring to time series information shown in FIG. 3, a method for detecting operation segments by batch processing is explained. In FIG. 3, $P_1 \sim P_8$ show time series information (position information of hand) of each frame acquired by the time series information acquisition unit 101. When the gesture recognition apparatus recognizes a motion along a direction of right and left, first, the operation segment detection unit 102 detects a segment $P_1 \sim P_3$ (from a start point $P_1$ to a turning point $P_3$ immediately thereafter) as a first operation segment and a segment $P_3 \sim P_6$ (from an end point $P_3$ of the first operation segment to a turning point $P_6$ immediately thereafter) as a second operation segment, and outputs information of detected operation segments to the recognition unit 103. Here, the operation segment detection unit 102 does not detect a third operation segment. Next, the operation segment detection unit 102 detects a segment $P_1 \sim P_3$ as the third operation segment, a segment $P_3 \sim P_6$ as the first operation segment, a segment $P_6 \sim P_8$ as the second operation segment, and outputs information of detected operation segments to the recognition unit 103. The operation segment detection unit 102 repeats above-mentioned processing until the end position of the first operation segment is an end point of the time series information.

Next, a method for detecting operation segments by real-time processing is explained. When an operation segment is detected in real-time, a method for detecting the first and second operation segments is different from above-mentioned method using batch processing. When at least one turning point exists, the operation segment detection unit 102 detects the latest turning point as the start point of the first operation segment. When no turning point exists, the operation segment detection unit 102 detects a start point of the time series information as the start point of the first operation segment. When at least one turning point exists until a predetermined period $T_{oa}$ has passed from acquisition time of the latest time series information, the operation segment detection unit 102 detects the turning point as the endpoint of the first operation segment. When no turning point exists, the operation segment detection unit 102 detects an end position of the latest time series information acquired until the predetermined period $T_{oa}$ has passed (a time when the predetermined period $T_{oa}$ has passed is called "decision time of operation segment") as the start point of the first operation segment.

Furthermore, at the decision time, the operation segment detection unit 102 detects the end point of the first operation segment as the start point of the second operation segment. When at least one turning point exists after this start point, the operation segment detection unit 102 detects this turning point as the end point of the second operation segment. When no turning point exists, the operation segment detection unit 102 detects the end position as the end point of the second operation segment.

The operation segment detection unit 102 requires a predetermined period $T_{oa}$ from a start time of detection of the operation segment to a decision time of detection of the first and second operation segments. Briefly, when the predetermined period $T_{oa}$ has passed from a time $T_t$ to start detection of the operation segment, i.e., at a time $(T_t + T_{oa})$, the operation segment detection unit 102 determines detection of the first and second operation segments. In the first embodiment, the first and second operation segments are detected in real-time. Strictly speaking, a delay of the predetermined period $T_{oa}$ occurs until detection thereof is determined. Accordingly, a delay of the predetermined period $T_{oa}$ occurs for recognition by the recognition unit 103 (explained afterwards).

By referring to FIG. 3, detection process of the operation segment is explained in time series. First, the latest point $P_1$ (start point) as the latest time series information is acquired by the time series information acquisition unit 101. At this time, the operation segment detection unit 102 does not detect an operation segment.

Next, when a next latest point $P_2$ is acquired by the time series information acquisition unit 101 (this timing is a time $T_2$), the operation segment detection unit 102 detects a segment $P_1 \sim P_2$ as the first operation segment ($P_1$ is a start point and $P_2$ is an end point thereof). Another segment does not exist before the first operation segment. Accordingly, the third operation segment is not detected. At this timing, the start point of the first operation segment is decided as $P_1$. However, the end point thereof is not decided yet. If the latest point is acquired until the predetermined period $T_{oa}$ has passed from time $T_2$, the end point of the first operation segment is updated.

For example, if $P_3$ is acquired until the predetermined period $T_{oa}$ has passed from time $T_2$, the operation segment detection unit 102 detects a segment $P_1 \sim P_3$ as the first operation segment. In this case, another operation segment does not exist immediately before and after the first operation segment. Accordingly, the operation segment detection unit 102 does not detect the third and second operation segments, and outputs the first operation segment as information which detection start time of operation segment is $T_2$ to the recognition unit 103.

If $P_3$ and $P_4$ are acquired until the predetermined period $T_{oa}$ has passed from time $T_2$, $P_3$ is a turning point immediately after the start point $P_1$ of the first operation segment. Accordingly, the operation segment detection unit 102 decides a segment $P_1 \sim P_3$ as the first operation segment ($P_3$ is an end point thereof). In this case, the operation segment detection unit 102 decides a segment $P_3 \sim P_4$ as the second operation segment (the end point $P_3$ of the first operation segment is a start point thereof, and the latest point $P_4$ is an end point thereof).

If $P_3 \sim P_7$ are acquired until the predetermined period $T_{oa}$ has passed from time $T_2$, $P_3$ is a turning point immediately after the start point $P_1$ of the first operation segment. Accordingly, the operation segment detection unit 102 decides a segment $P_1 \sim P_3$ as the first operation segment ($P_3$ is an end point thereof). In this case, the operation segment detection unit 102 decides a segment $P_3 \sim P_6$ as the second operation segment (the turning point $P_3$ is a start point thereof, and a turning point $P_6$ immediately after the start point is an end point thereof).

On the other hand, if $P_3$ is not acquired until the predetermined period $T_{oa}$ has passed from time $T_2$, $P_2$ is the end point. Accordingly, the operation segment detection unit 102 detects a segment $P_1 \sim P_2$ as the first operation segment ($P_2$ is an end point thereof). In this case, the operation segment detection unit 102 does not detect the second and third operation segments, and outputs the first operation segment as information which detection start time of operation segment is $T_2$ to the recognition unit 103. Next, when the latest point $P_4$ is acquired by the time series information acquisition unit 101 (this timing is $T_4$), the operation segment detection unit 102 detects a segment $P_3 \sim P_4$ as the first operation segment (the turning point $P_3$ is a start point thereof, and the latest point $P_4$ is an end point thereof). Here, an operation segment of which end point is the start point $P_3$ of the first operation segment is decided as the third operation segment.

Hereafter, until the latest point $P_8$ is acquired by the time series information acquisition unit 101, the same processing is executed.

Moreover, after determining the first and second operation segments, the operation segment detection unit 102 may not output information of the first, second and third operation segments to the recognition unit 103. The operation segment detection unit 102 may output information of each operation segment to the recognition unit 103 whenever the operation segment is detected.

The predetermined period $T_{oa}$ is approximately set to 0.4 second. Furthermore, the operation segment detection unit 102 may change $T_{oa}$ based on the movement velocity of a specific part in the operation segment. For example, the higher the movement velocity is, the shorter the predetermined period $T_{oa}$ may be.

(The Recognition Unit)

Among a plurality of operation segments detected by the operation segment detection unit 102, the recognition unit 103 recognizes whether the first operation segment (as a recognition target) is a forward operation. Here, by using feature (movement velocity of hand) extracted from time series information in the second and third operation segments, the recognition unit 103 recognizes a motion corresponding to the first operation segment. Concretely, if following two conditions are satisfied, a hand motion corresponding to the first operation segment is recognized as the forward operation.

The first condition: The third operation segment does not exist. Alternatively, a movement velocity $V_c$ (first feature) of hand in the first operation segment is higher than a movement velocity $V_b$ (third feature) of hand in the third operation segment.

The second condition: The second operation segment does not exist. Alternatively, the movement velocity $V_c$ (first feature) of hand in the first operation segment is higher than a movement velocity $V_a$ (second feature) of hand in the second operation segment.

In the first and second conditions, as the movement velocity of hand in an operation segment, a maximum among movement velocities calculated from each frame in the operation segment is used.

A direction of the forward operation recognized by the recognition unit 103 is calculated from coordinates of a start point and an end point of the first operation segment. For example, when the gesture recognition apparatus recognizes a forward operation along right and left (x-axis direction), a direction of the forward operation is calculated from a difference between x-coordinates of a start point and an end point of the first operation segment. Moreover, if a movement velocity of hand in the first operation segment is above a predetermined threshold, this hand motion may be recognized as non-forward operation. Furthermore, by calculating a distance between the start point and the end point of the first operation segment as a movement distance $L_c$ of hand, if the movement distance $L_c$ is below the predetermined threshold, this hand motion may be recognized as non-forward operation.

Moreover, when the operation segment detection unit 102 detects each operation segment in real-time, a predetermined period $T_{oa}$ is required from start of detection of operation segment to decision of detection of the first and second operation segments. Accordingly, a delay of the predetermined period $T_{oa}$ occurs for recognition by the recognition unit 103.

As mentioned-above, in the gesture recognition apparatus of the first embodiment, the forward operation is recognized by using time series information of the user's hand position in not only an operation segment as a recognition target but also other operation segments before and after the operation segments. As a result, it is prevented that the user's previous swing and return swing are erroneously recognized as the forward operation.

(The Command Generation Unit)

The command generation unit 104 generates a command based on the recognition result from the recognition unit 103. When the forward operation recognized is a motion "from right to left", the command generation unit 104 generates a command to move an object to be transferred by gesture "from right to left". In this case, after this command is generated, the command generation unit 104 need not generate the same command again while the start point of the first operation segment is being same.

(The Display Control Unit)

Figure 4:
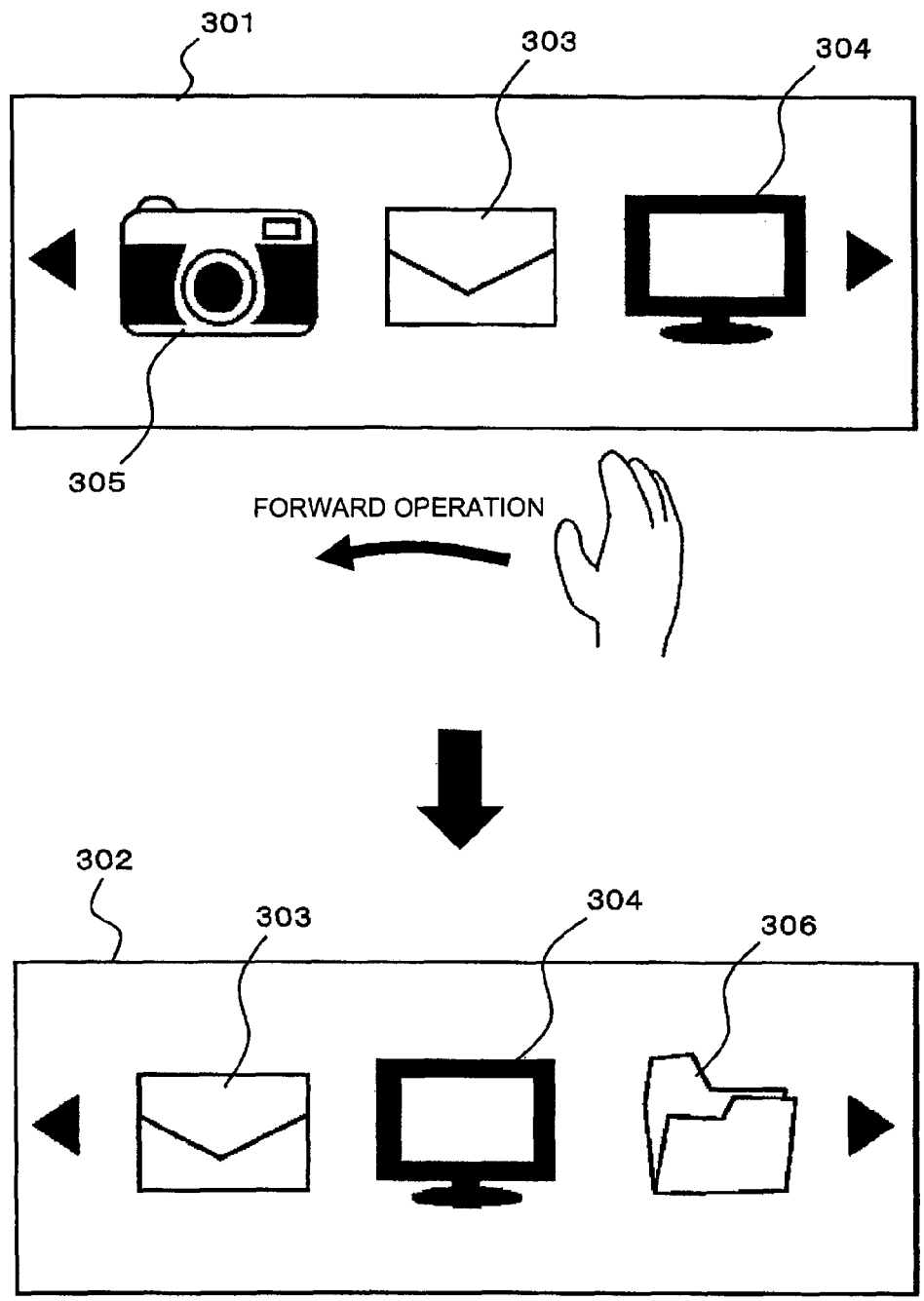
FIG. 4 is one example of a screen displayed in the gesture recognition apparatus according to the first embodiment.

Based on the command generated by the command generation unit 104, the display control unit 105 changes a shape of an object (to be controlled by the command) displayed on the display 207. For example, when a command to move the object "from right to left" is accepted, as shown in FIG. 4, each position of objects 303~305 displayed on a screen 301 is one-shifted to the left side as displayed on a screen 302. Briefly, an object 303 positioned at the center is shifted to the left side, an object 305 positioned at the right side is shifted to the center, an object 305 positioned at the left side of the object 303 disappears from the screen, and an object 306 positioned at the right side of the object 304 appears on the screen 302.

(Flow Chart: Entire Processing)

Figure 5:
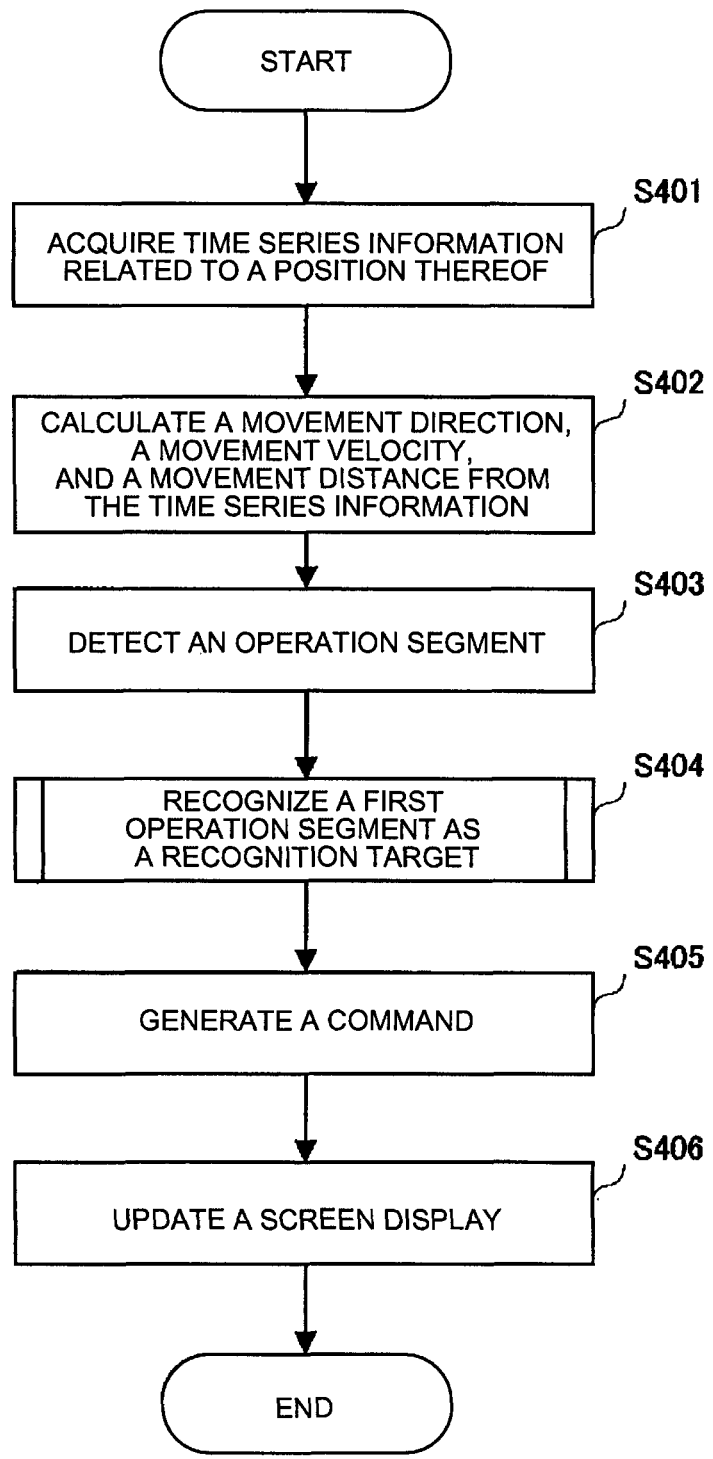
FIG. 5 is a flow chart of processing of the gesture recognition apparatus according to the first embodiment.

By referring to a flow chart of FIG. 5, processing of the gesture recognition apparatus of the first embodiment is explained. First, at S401, the time series information acquisition unit 101 acquires time series information related a position of the user's hand.

At S402, the operation segment detection unit 102 calculates a movement direction, a movement velocity, and a movement distance of the hand.

At S403, the operation segment detection unit 102 detects a plurality of operation segments.

At S404, the recognition unit 103 recognizes whether a motion corresponding to the first operation segment (recognition target) is a forward operation. Detail processing of S404 is explained afterwards.

At S405, the command generation unit 104 generates a command based on the recognition result of S404. If the first operation segment is recognized as a forward operation, a command based on the forward operation is generated. On the other hand, if the first operation segment is not recognized as the forward operation and abandoned, the command is not generated.

At S406, the display control unit 105 updates a display screen to be presented to the user, based on the command from the command generation unit 104.

(Flow Chart: S404)

Figure 6:
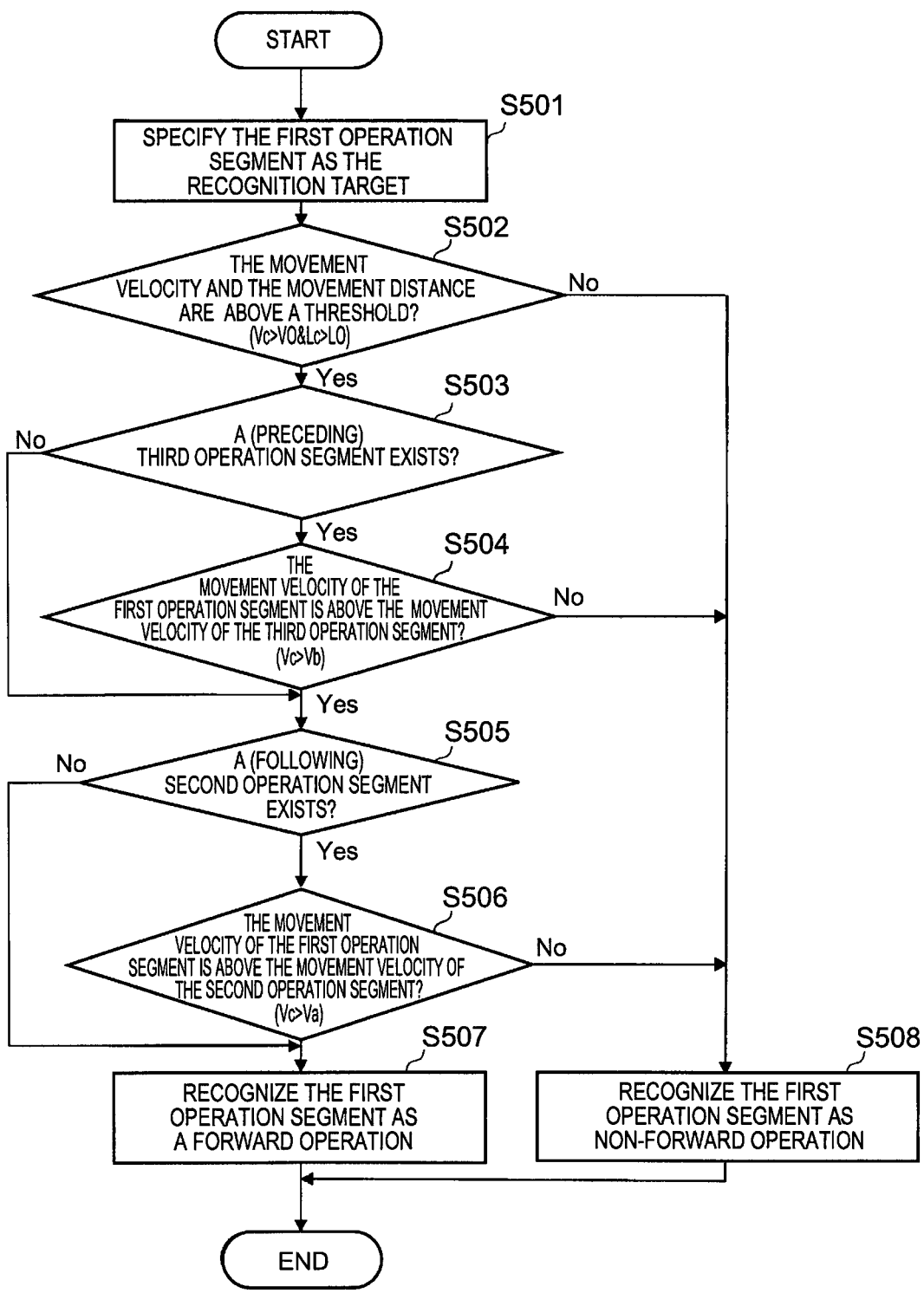
FIG. 6 is a flow chart of S404 in FIG. 5.

By referring to FIG. 6, processing of S404 is explained. First, at S501, the recognition unit 103 specifies a first operation segment as a recognition target.

At S502, the recognition unit 103 decides whether a movement velocity $V_c$ and a movement distance $L_c$ of the first operation segment are respectively above predetermined thresholds $V_0$ and $L_0$. If the movement velocity and the movement distance are respectively above the thresholds, processing is forwarded to S503. If at least one of the movement velocity and the movement distance are not above the thresholds, processing is forwarded to S508, and the first operation segment is recognized as non-forward operation.

At S503, the recognition unit 103 decides whether a third operation segment preceding the first operation segment is detected by the operation segment detection unit 102. If the third operation segment is not detected, processing is forwarded to S505. If the third operation segment is detected, processing is forwarded to S504.

At S504, the recognition unit 103 compares a movement velocity $V_c$ of the first operation segment with a movement velocity $V_b$ of the third operation segment. If $V_c$ is above $V_b$, processing is forwarded to S505. If $V_c$ is not above $V_b$, processing is forwarded to S508. In this way, in the gesture recognition apparatus of the first embodiment, by comparing a movement velocity of a first operation segment (recognition target) with a movement velocity of a third operation segment preceding the first operation segment, it is prevented that a return swing occurred after a forward operation is erroneously recognized as the forward operation.

At S505, the recognition unit 103 decides whether a second operation segment following the first operation segment is detected by the operation segment detection unit 102. If the second operation segment is not detected, processing is forwarded to S507. If the second operation segment is detected, processing is forwarded to S506.

At S506, the recognition unit 103 compares the movement velocity $V_c$ of the first operation segment with a movement velocity $V_a$ of the second operation segment. If $V_c$ is above $V_a$, processing is forwarded to S507. If $V_c$ is not above $V_a$, processing is forwarded to S508. In this way, in the gesture recognition apparatus of the first embodiment, by comparing a movement velocity of a first operation segment (recognition target) with a movement velocity of a second operation segment following the first operation segment, it is prevented that a previous swing occurred before a forward operation is erroneously recognized as the forward operation.

(Effect)

As mentioned-above, in the gesture recognition apparatus of the first embodiment, the forward operation is recognized by using time series information of the user's hand position in not only an operation segment as a recognition target but also other operation segments before and after the operation segments. As a result, it is prevented that the user's previous swing and return swing are erroneously recognized as the forward operation.

(Modification 1)

In the first embodiment, when the operation segment detection unit 102 detects an operation segment in real-time, delay of the predetermined period $T_{oa}$ occurs. However, before passing the predetermined period $T_{oa}$, the operation segment may be detected. For example, in FIG. 3, assume that an end position of the first operation segment is $T_3$ (acquisition time of $P_3$) and time series information $P_3\sim P_8$ is acquired in the predetermined period $T_{oa}$ passed from $T_3$. Here, in the modification 1, without waiting lapse of the predetermined period $T_{oa}$, the operation segment detection unit 102 determines a segment $P_3\sim P_6$ as a second operation segment at a timing when P6 is detected as a turning point, and outputs this information to the recognition unit 103. As a result, time-lag necessary for recognition can be reduced.

Furthermore, a movement velocity (first feature) of the first operation segment is continually compared with a movement velocity of each frame of time series information acquired after the end position of the first operation segment. When the movement velocity of a frame is above the movement velocity of the first operation segment, the first operation segment can be recognized as non-forward operation. As a result, time-lag necessary for recognition can be reduced.

(Modification 2)

In the gesture recognition apparatus of the first embodiment, a forward operation is detected on the assumption that a movement velocity of hand as the forward operation is higher (quicker) than a movement velocity of hand as a previous swing and a return swing. However, the forward operation may be detected on the assumption that the movement velocity of hand as the forward operation is lower (slower) than the movement velocity of hand as the previous swing and the return swing. For example, in an application to change a screen display shown in FIG. 4, when the application indicates a user to slowly move the user's hand along a direction to be intended, the gesture recognition apparatus of modification 2 can be used.

If following two conditions are satisfied, the recognition unit 103 of the modification 2 recognizes a hand motion corresponding to the first operation segment as the forward operation.

The first condition: The third operation segment does not exist. Alternatively, a movement velocity $V_c$ of hand in the first operation segment is lower than a movement velocity $V_b$ of hand in the third operation segment.

The second condition: The second operation segment does not exist. Alternatively, the movement velocity $V_c$ of hand in the first operation segment is higher than a movement velocity $V_a$ of hand in the second operation segment.

Furthermore, conditions at S504 and S506 in FIG. 6 are respectively $V_c<V_b$ and $V_c<V_a$.

Moreover, as a feature extracted from time series information of each operation segment, a multiplication result of the movement velocity of hand with "−1" may be used. As a result, in the same way as the processing of the first embodiment, the forward operation can be detected on the assumption that "the movement velocity of hand as the forward operation is lower (slower) than the movement velocity of hand as the previous swing and the return swing".

(Modification 3)

In the first embodiment, as a feature extracted from time series information of the first~third operation segments, the recognition unit 103 utilizes a movement velocity of hand. However, the recognition unit 103 may utilize a movement distance of hand as the feature. On the assumption that a movement distance of the forward operation is longer than each movement distance of the previous swing and the return swing, if the movement distance $L_c$ of the first operation segment is longer than each movement distance of the second and third operation segments, a hand motion corresponding to the first operation segment is recognized as the forward operation.

In addition to this, an absolute value of acceleration of hand may be used as the feature. On the assumption that an absolute value of acceleration of the forward operation is larger than each absolute value of acceleration of the previous swing and the return swing, if the absolute value of acceleration of the first operation segment is larger than each absolute value of acceleration of the second and third operation segments, a hand motion corresponding to the first operation segment is recognized as the forward operation. Moreover, as the absolute value of acceleration of each operation segment, a maximum among absolute values of acceleration calculated from time series information of the segment is used.

Furthermore, an evaluation value E represented by an equation (1) may be used as the feature of each operation segment.

$$\text{Evaluation value } E = V \times \exp\{\alpha \times (Q-P) \times F(\text{dir})\} \quad (1)$$

Here, V is a maximum of movement velocity of hand in each operation segment, α is a positive coefficient, Q is an end position of the operation segment, P is a basis position, and F(dir) is a predetermined function. For example, P is set as a position (start point of time series information) where the hand is first detected. F(dir) is a function of which value is "1" or "−1". For example, notice a hand motion along a direction of right and left. On a coordinate axis having the origin P, if a movement direction of the operation segment is positive direction, F(dir) is "1". If the movement direction of the operation segment is negative direction, F (dir) is "−1". Briefly, if the end point of each operation segment is positioned at the right side than the basis position P, an evaluation value E of the operation segment of which movement direction is right is a multiplied value of V with a ratio larger than "1". The evaluation value E of the operation segment of which movement direction is left is a multiplied value of V with a ratio smaller than "1". Briefly, when the hand is moved along a direction of right and left with the same movement velocity in the right side region from the basis position P, the evaluation value E of an operation segment moving toward the right side direction has a higher value. As a result, even if a movement velocity of each hand motion is constant, it is prevented that the user's previous swing and return swing are erroneously recognized as a forward operation. Moreover, P may be set as a position of the user's elbow.

(Modification 4)

In the gesture recognition apparatus, a push and pull motion of the palm of the hand along a frontal direction toward the camera 206 can be recognized as a forward operation. Here, the time series information acquisition unit 101 acquires a size (For example, a rectangular area surrounding the hand) of the palm of the hand as time series information, and calculates a change direction (enlargement direction, reduction direction) of the time series information as a movement direction of the hand. A movement velocity of the hand is replaced with a velocity (a maximum of change quantity per unit time) of change of the size of the hand, a movement distance of the hand is replaced with a change quantity of the size of the hand.

(Modification 5)

In the gesture recognition apparatus of the first embodiment, the forward operation is recognized by using time series information of the hand position in not only an operation segment (first operation segment) as a recognition target but also other operation segments (second and third operation segments) before and after the operation segment. However, the forward operation may be recognized by using time series information of the hand position in the first operation segment and the second operation segment following the first operation segment. As a result, it is prevented that a previous swing occurred before the forward operation is erroneously recognized as the forward operation.

Furthermore, in the gesture recognition apparatus of the first embodiment, a motion of the user's hand is recognized. In addition to this, a specific part such as the user's face or leg may be recognized. Furthermore, not the specific part but an object may be recognized. For example, the forward operation can be recognized from all parts or a specific part of the object such as a remote controller, a sensor or a marker.

Furthermore, the operation segment detection unit 102 and the recognition unit 103 can detect an operation segment by thinning out time series information acquired by the time series information acquisition unit 101. For example, calculation load can be reduced by alternately processing each frame.

(Modification 6)

In the first embodiment, as to recognition in real-time, the operation segment detection unit 102 detects/updates information of the first~third operation segments whenever the time series information acquisition unit 101 acquires a detection point. However, a method for detection is not limited to this method, and detection of operation segment may be started at a specific time only. In the modification 6, in order to reduce calculation load to detect the operation segment, a start time to detect the operation segment is determined based on a recognition result of a previous frame by the recognition unit 103. Concretely, the operation segment is detected by following process.

First, when a start point and an end point are detected, hereafter, whenever the time series information acquisition unit 101 acquires the latest point, a feature extracted from the first operation segment at the time is compared with a feature extracted from the third operation segment. Here, a first time when a feature of the first operation segment is above a feature of the third operation segment is set as a detection start time $T_c$, and information thereof is output to the recognition unit 103 (The information is determined at a time "$T_c+T_{oa}$". After determining, this information may be outputted. During a period until the information is determined, the information may be outputted whenever the time series information acquisition unit 101 acquires a detection point.). After that, the operation segment detection unit 102 does not output information to the recognition unit 103 until a next turning point is detected.

The Second Embodiment

Figure 7:
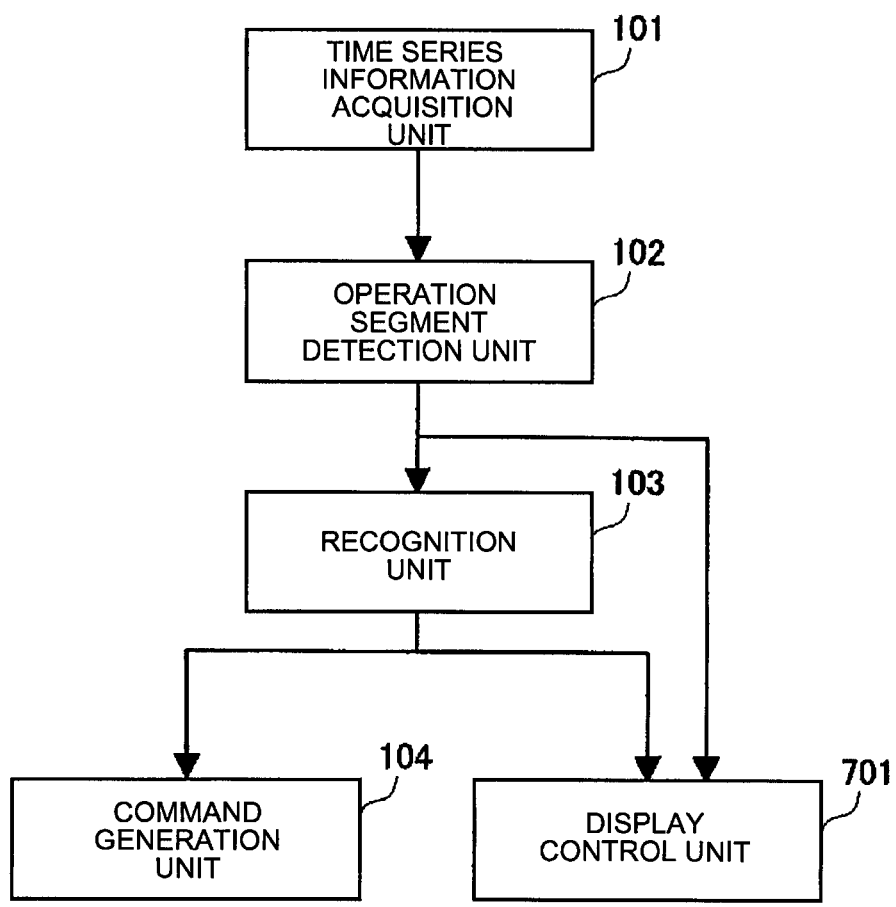
FIG. 7 is a block diagram of a gesture recognition apparatus according to the second embodiment.

FIG. 7 is a block diagram showing a component of the gesture recognition apparatus according to the second embodiment. As a specific point of the second embodiment different from the first embodiment, based on a detection status of the operation segment (by the operation segment detection unit 102) and a recognition status (by the recognition unit 103), the display control unit 701 changes a shape of the object controlled by a user's forward operation. Here, the shape of the object means not only appearance of the object but also a display position of the object on the display 207.

Figure 8:
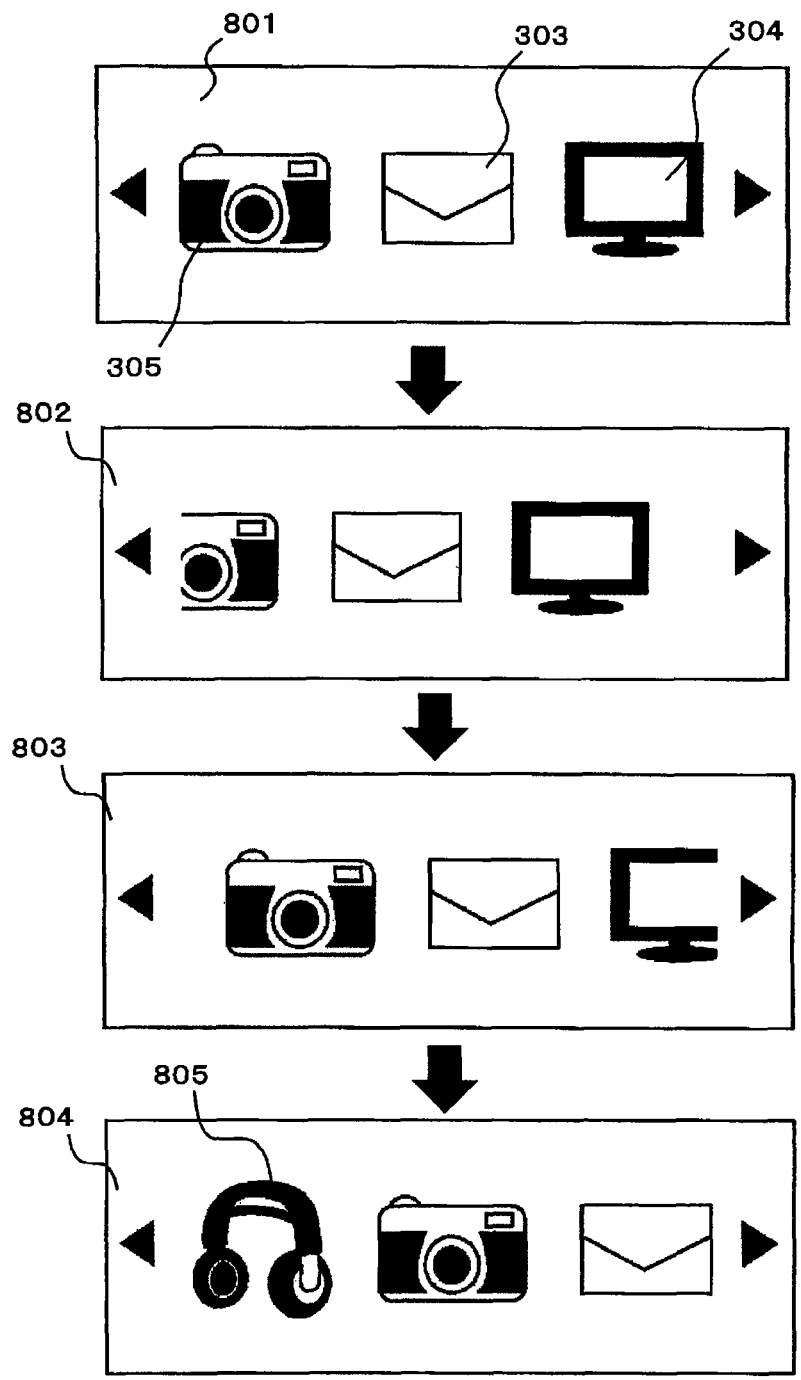
FIG. 8 is one example of a screen displayed in the gesture recognition apparatus according to the second embodiment.

In the gesture recognition apparatus of the second embodiment, based on a recognition status of the first operation segment, a screen display to be presented to a user is updated one by one. For example, as shown in FIG. 8, an application to move an object (to be controlled by a command) along a direction of right and left by the hand's forward operation is thought about.

When a forward operation to move the object "from left to right" is performed, a previous swing "from right to left" occurs before the forward operation, and a turn swing "from right to left" occurs after the forward operation. In the second embodiment, at a time when a motion "from right to left" of which movement velocity and movement distance are above a predetermined threshold is detected, the display control unit 701 slowly moves objects 303~305 from right to left as shown in a screen 802. Then, when a feature of the motion "from left to right" is larger than a feature of a previous operation segment, the display control unit 701 slowly moves the objects 303~305 from left to right as shown in a screen 803. Last, when the recognition unit 103 decides that the hand motion "from left to right" is recognized as a forward operation, the display control unit 701 quickly shifts the objects 303~305 and 805 to the right position as shown in a screen 804.

Figure 9:
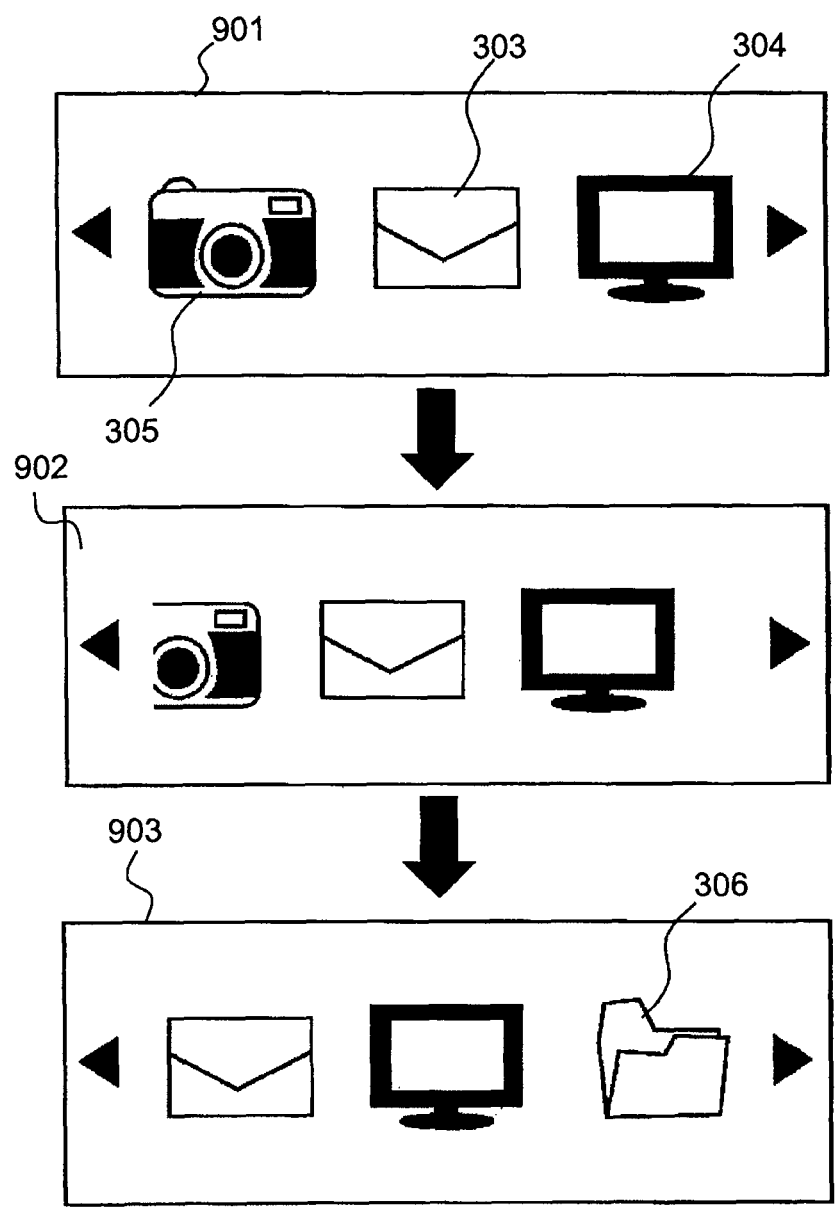
FIG. 9 is another example of a screen displayed in the gesture recognition apparatus according to the second embodiment.

In addition to this, if a previous swing does not occur before the forward operation, at a time when the hand's forward operation "from right to left" is detected, the display control unit 701 slowly moves the objects 303~305 from right to left as shown in a screen 902 of FIG. 9. Then, when the recognition unit 103 decides that the hand motion "from right to left" is recognized as a forward operation, the display control unit 701 quickly shifts the objects 303~306 to the left position as shown in a screen 903 of FIG. 9.

As mentioned-above, in the gesture recognition apparatus of the second embodiment, based on a recognition status of the first operation segment, information to be presented to the user is updated one by one. As a result, the recognition status can be feedbacked to the user one by one, and operability sensed by the user improves.

(Flow Chart: the Display Control Unit)

Figure 10:
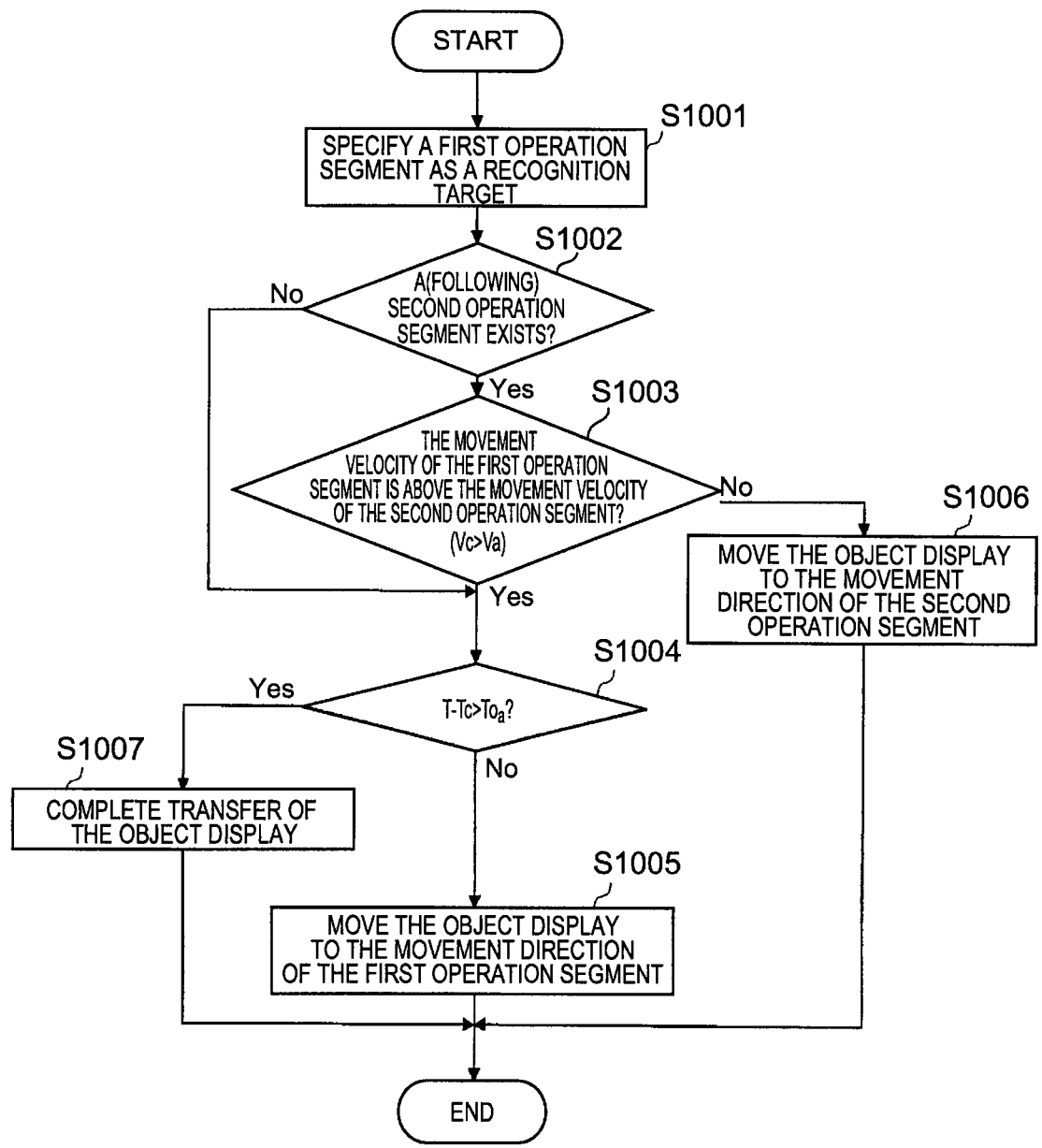
FIG. 10 is a flow chart of processing of a display control unit 701 in FIG. 7.

By referring to FIG. 10, processing of the display control unit 701 of the gesture recognition apparatus of the second embodiment is explained. By using a detection status of operation segment by the operation segment detection unit 102 and a recognition status acquired by the recognition unit 103, the display control unit 701 controls information to be presented to the user. Here, the case of the modification 6 is explained. Briefly, assume that a first time when a feature of the first operation segment is larger than a feature of the second operation segment is $T_C$. A display situation during a period from time $T_c$ to time $T_c+T_{oa}$ (when a recognition result by the recognition unit 103 is determined) is explained.

First, at S1001, the recognition unit 103 specifies a first operation segment as a recognition target.

At S1002, the operation segment detection unit 102 decides whether a second operation segment (following the first operation segment) is detected. If the second operation segment is detected, processing is forwarded to S1003. If the second operation segment is not detected, processing is forwarded to S1004.

At S1003, the recognition unit 103 compares a movement velocity $V_c$ of the first operation segment with a movement velocity $V_a$ of the second operation segment. If $V_c$ is above $V_a$, processing is forwarded to S1004. If $V_c$ is not above $V_a$, processing is forwarded to S1006.

At No of S1003, the recognition unit 103 decides that $V_a$ is above $V_c$. Briefly, a motion of the hand in the first operation segment is not recognized as a forward operation. Accordingly, at S1006, the display control unit 701 moves the object displayed to a movement direction of the second operation segment as a next target to be recognized.

Moreover, after forwarding to S1006, from a next frame, the second operation segment (in above-mentioned processing) is regarded as a first operation segment, and processing from S1001 is executed.

At S1004, it is decided whether a difference between the present time T and the detection start time $T_c$ is above $T_{oa}$. If the difference is above $T_{oa}$, the first operation segment is decided as a forward operation. Accordingly, at S1007, transfer of an object display is completed. If the difference is not above $T_{oa}$, at S1005, the object display (as a control target) is slowly moved to a movement direction of the first operation segment. Moreover, at this step, it is not decided that the hand motion in the first operation segment is recognized as the forward operation.

In this way, in the gesture recognition apparatus of the second embodiment, before recognition of the forward operation is decided, the object display (as a transfer target) is updated. As a result, the recognition status is feedbacked to a user one by one, and operability sensed by the user improves.

(Effect)

As mentioned-above, in the gesture recognition apparatus of the second embodiment, based on the recognition status of the first operation segment, a screen display to be presented to the user is updated one by one. As a result, the recognition status is feedbacked to a user one by one, and operability sensed by the user improves.

(Modification 7)

Figure 11A:
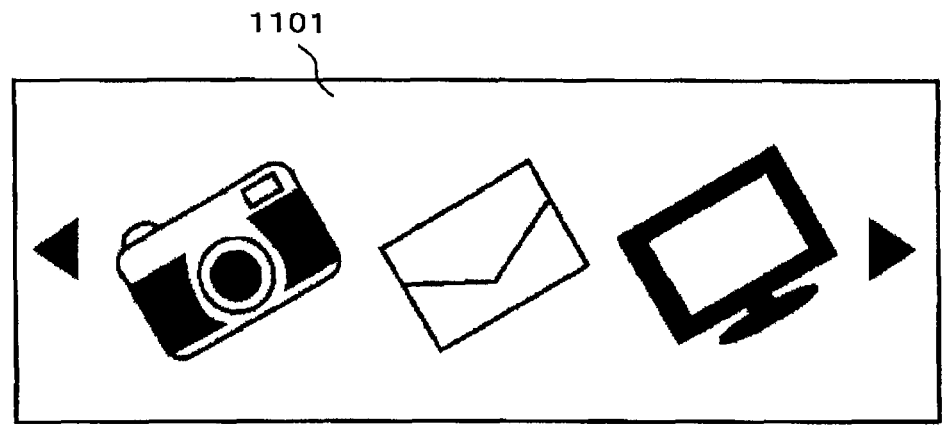
FIGS. 11A, 11B and 11C are first example of a screen displayed in the gesture recognition apparatus according to a modification 7.
Figure 11B:
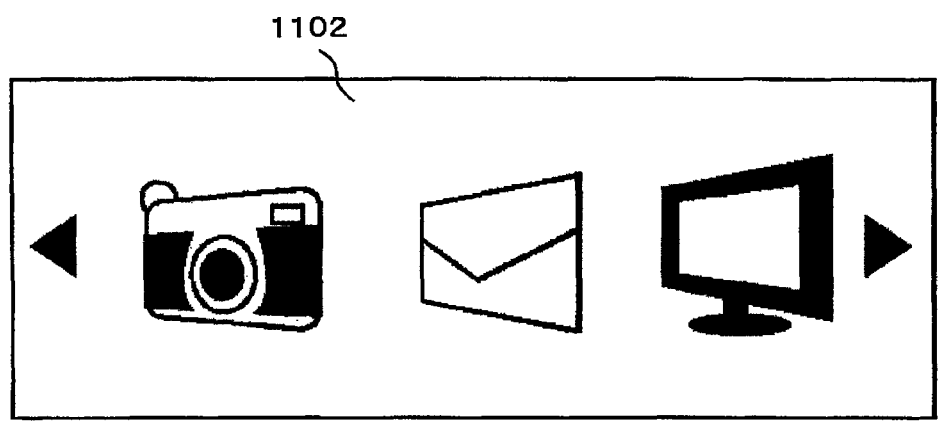
Figure 11C:
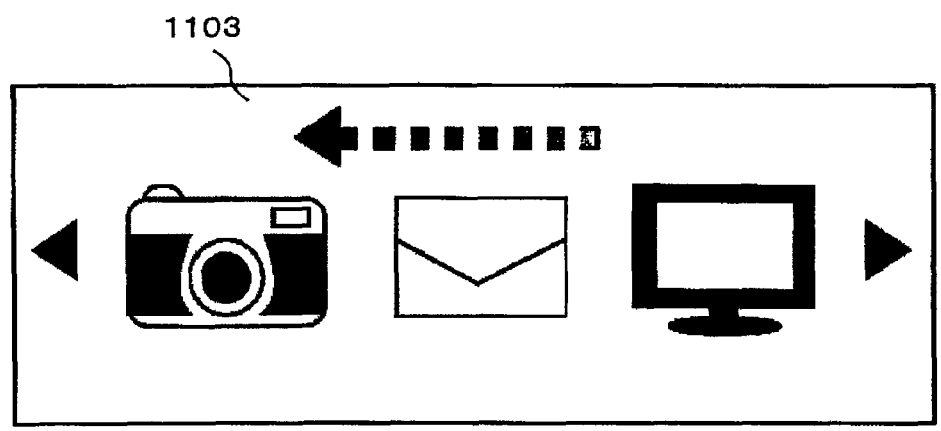
Figure 13:
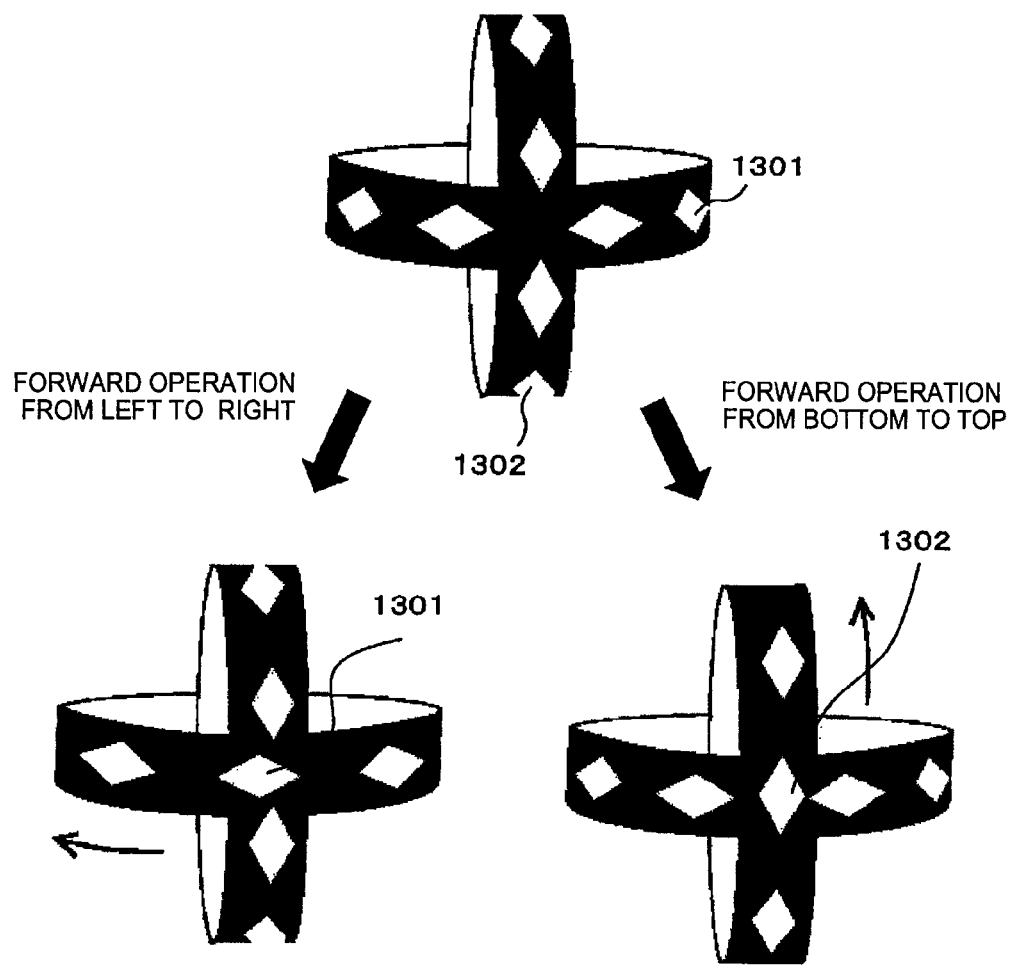
FIG. 13 is third example of the screen displayed in the gesture recognition apparatus according to the modification 7.
Figure 14:
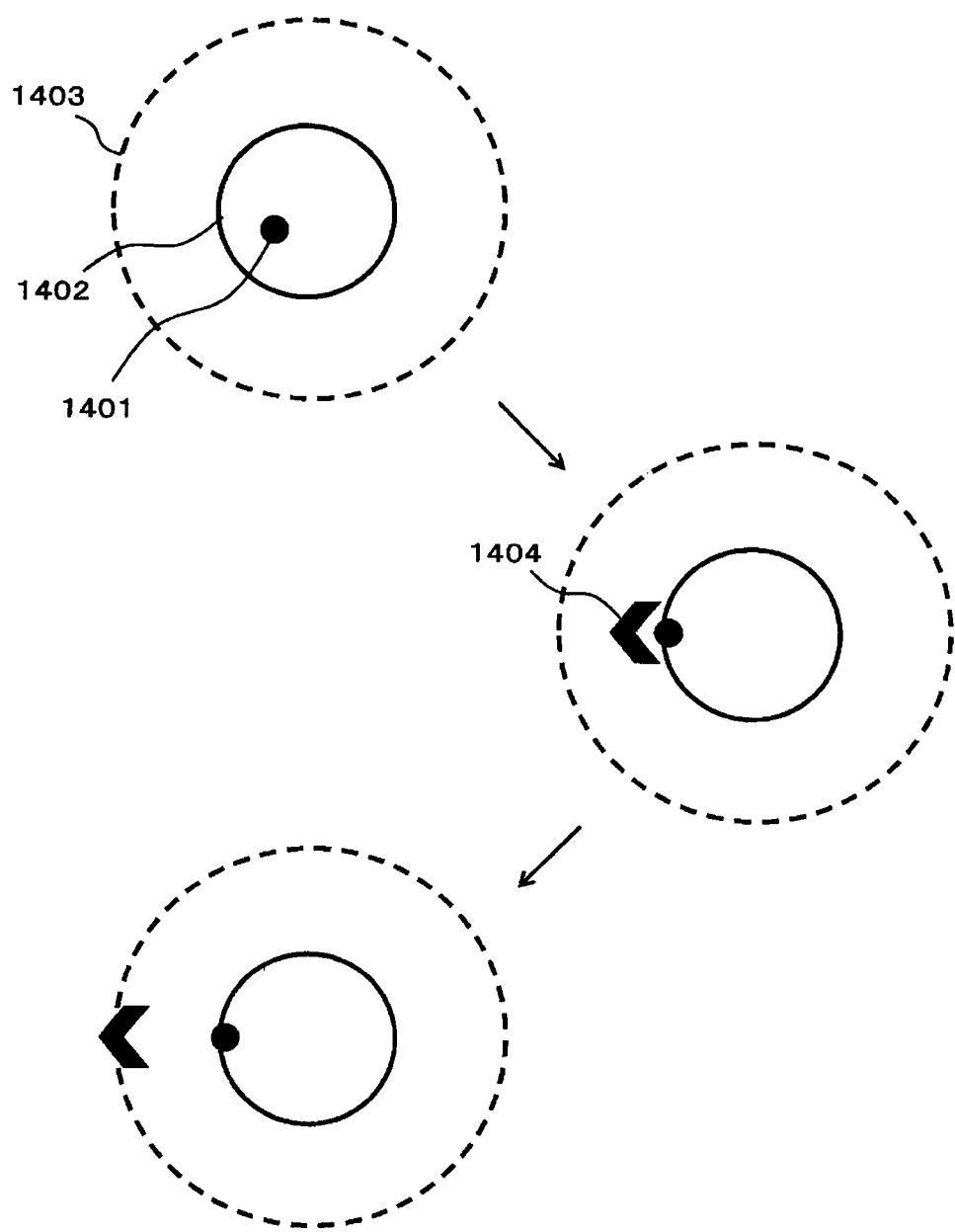
FIG. 14 is fourth example of the screen displayed in the gesture recognition apparatus according to the modification 7.

Display control by the display control unit 701 is not limited to slow moving of the object. For example, as shown in FIGS. 11A~11C, the object may be obliquely moved to the movement direction (1101), the object may be rotationally moved to the movement direction (1102), and an arrow may be displayed along the movement direction (1103). As a result, the recognition result by the recognition unit 103 can be feedbacked to a user one by one. In addition to this, examples shown in FIGS. 12~14 are thinkable.

Figure 12:
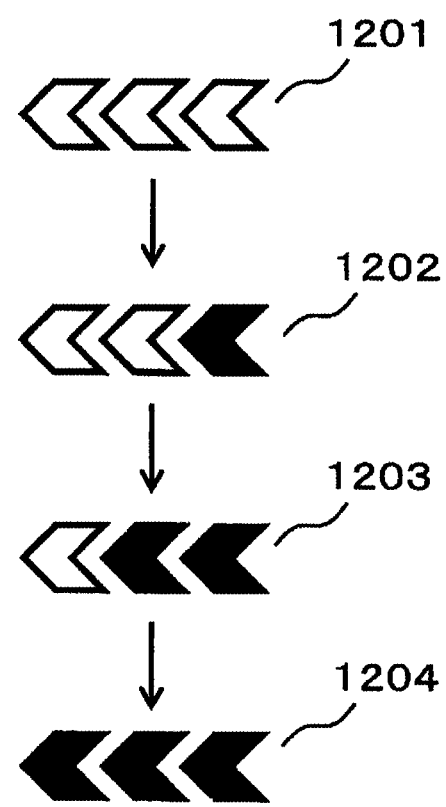
FIG. 12 is second example of the screen displayed in the gesture recognition apparatus according to the modification 7.

In FIG. 12, for example, if a movement direction of the first operation segment is "from right to left" at S1005 of FIG. 10, a gauge 1201 is displayed. Based on a progress ratio of the recognition processing by the recognition unit 103, the gauge 1202~1204 is changeably displayed. Here, the progress ratio is calculated using a lapse time $(T-T_c)$ (from the detection start time $T_o$ to the present time T) and $T_{oa}$, by an equation (2).

$$\text{Progress ratio}=(T-T_c)/T_{oa} \quad (2)$$

If the progress ratio is not above 0.33, the arrow 1201 is displayed. If the progress ratio is above 0.33 and not above 0.66, the arrow 1202 is displayed. If the progress ratio is above 0.66, the arrow 1203 is displayed. If the progress ratio is 1, the arrow 1204 is displayed. Moreover, before $T_{oa}$ has passed, when a hand motion in the first operation segment is decided to be recognized as a forward operation, the progress ratio can be compulsorily set to 1. Furthermore, when the first operation segment is decided as non-forward operation, the gauge may be displayed along a movement direction of the hand in the second operation segment (following the first operation segment).

In FIG. 13, the display control unit 701 displays a gauge having a ring (vertically rotating) along top and down direction and a ring (horizontally rotating) along right and left direction. For example, when a movement direction of the first operation segment is left, the ring along right and left direction slowly rotates toward the left direction, and a pattern 1301 initially positioned at the right edge moves at the center. Here, at a time when the forward operation is recognized, so that each pattern moves to the left adjacent position, the pattern moves by uniform velocity based on the progress ratio. As to the right direction, the ring rotates in the same way.

On the other hand, when a movement direction of the first operation segment is up, the ring along top and down direction slowly rotates toward the up direction, and a pattern 1302 initially positioned at the down edge moves at the center. Here, at a time when the forward operation is recognized, so that each pattern moves to the up adjacent position, the pattern moves by uniform velocity based on the progress ratio. As to the down direction, the ring rotates in the same way.

In FIG. 14, the display control unit 701 displays a cursor 1401 connected with a hand motion, and a gauge comprising two concentric circles 1402 and 1403. In above-mentioned screen display, the gauge is first displayed when a movement distance or a movement velocity of hand in the first operation segment is above a threshold. Accordingly, as to a slight swing (below the threshold) of the hand, whether this swing is detected is not presented to a user. However, as to a gauge in FIG. 14, a cursor 1401 constantly connected with the hand motion is displayed. At timing when the cursor 1401 is out of the circle 1402 as the threshold, this display status represents start of recognition processing.

The cursor 1401 is displayed at a position separated from the center of the circle as a product of the movement distance and the movement velocity of hand, along a direction of the present hand position based on a position (start point of time series information) where the hand is first detected. If each threshold of the movement distance and the movement velocity is $L_0$ and $V_0$, a radius of the circle is $L_0 \times V_0$. At timing when the cursor 1401 is out of the circle 1402, an arrow 1404 representing a progress ratio and a direction thereof is displayed. The arrow 1404 begins to move along a direction separated from the center of the circle 1402 by a movement amount based on the progress ratio, so that the arrow 1404 reaches a circle 1403 when a predetermined period $T_{oa}$ has passed from the timing. When the arrow 1404 reaches the circle 1403, the hand motion in the first operation segment is recognized as a forward operation. Moreover, the progress ratio in FIG. 14 is calculated by an equation (3).

$$\text{Progress ratio} = \text{MIN}(\text{movement distance}, L0) \times \text{MIN}(\text{movement velocity}, V0) \quad (3)$$

(Modification 8)

At S1005, S1006 and S1007 in FIG. 10, a movement velocity of the object may be changed based on time series information of each operation segment. For example, based on a movement velocity of the hand or an absolute value of acceleration in the first operation segment, the movement velocity of the object can be changed. For example, in FIG. 12, when a user quickly waves his/her hand, the gauge may be quickly increased.

Application Example

Figure 15:
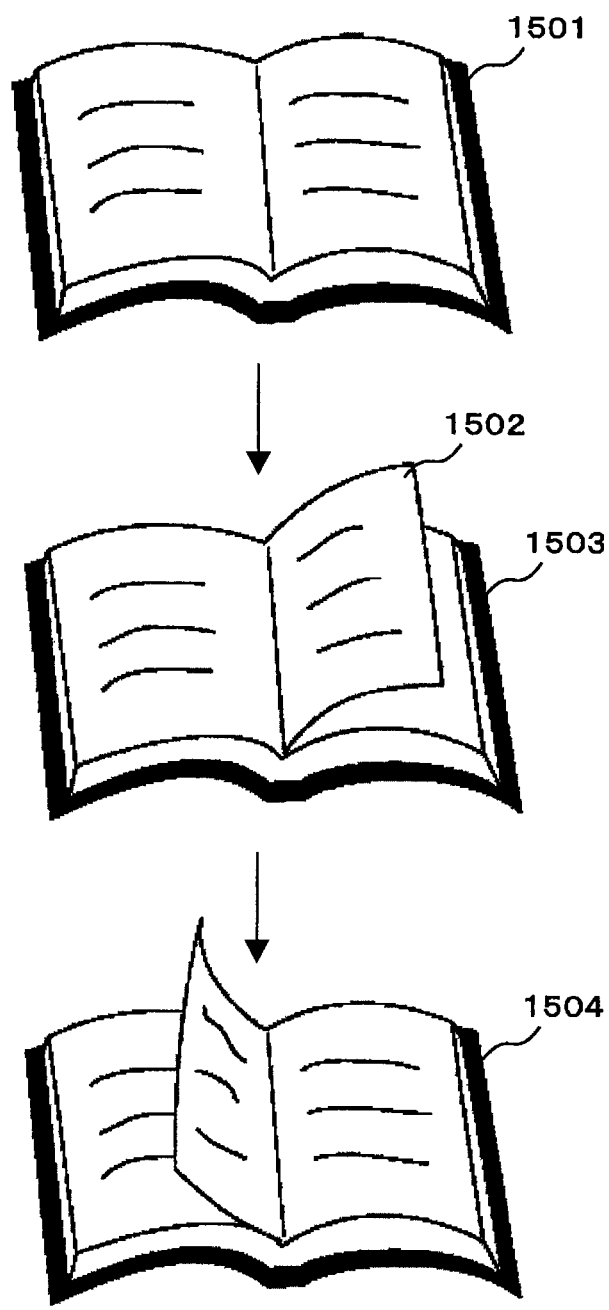
FIG. 15 is one example of a screen displayed in the gesture recognition apparatus according to an application thereof.

As to a terminal of an electronic book built-in the gesture recognition apparatus of the second embodiment, the electronic book can be controlled to turn over pages thereof by a user's gesture. As shown in FIG. 15, by displaying as if pages of the book are being turned over, effect that the user feels as if he/she turns over pages of the book is given to the user. Briefly, when a movement direction of the first operation segment is detected as left, if the progress ratio is 0, a book 1501 of which page is not turned over is displayed. If the progress ratio is 0.33, the book 1503 of which page 1502 is turned over to the left direction as ⅓ is displayed. If the progress ratio is 0.66, the book 1504 of which page 1502 is turned over to the left direction as ⅔ is displayed. If the progress ratio is 1, the book of which page 1502 is completely turned over to the left direction is displayed (not shown in FIG. 15).

Furthermore, as an intuitive operation to read a Web page unable to be displayed within a screen, a movement command along top and down direction and right and left direction may be used. In this case, as to one command, a read area of the screen may be moved in the Web page as a predetermined distance.

Furthermore, the gesture recognition apparatus may be used as an operation means to view a stereoscopic object by a CG (Computer Graphics) or a video by an omnidirectional camera from the user's desired angle. In this case, as to one command, a view angle thereof may be rotated as a predetermined angle.

(Effect)

As mentioned-above, in the gesture recognition apparatus of at least one embodiment, the forward operation is recognized by using time series information of the user's hand position in not only an operation segment as a recognition target but also other operation segments before and after the operation segments. As a result, it is prevented that the user's previous swing and return swing are erroneously recognized as the forward operation.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for recognizing a gesture, the apparatus being a computer that executes a stored program, comprising:
 a time series information acquisition unit as a function realized by the computer, configured to acquire time series information related to a position or a size of a specific part of a user's body;
 an operation segment detection unit as a function realized by the computer, configured to detect a movement direction of the specific part from the time series information, and to detect a plurality of operation segments each segmented by two of a start point, a turning point and an end point of the movement direction in time series order;
 a recognition unit as a function realized by the computer, configured to specify a first operation segment to be recognized, a second operation segment following the first operation segment, and a third operation segment preceding the first operation segment among the plurality of operation segments, and to recognize a motion of the specific part in the first operation segment by using a first feature extracted from the time series information of the first operation segment, a second feature extracted from the time series information of the second operation segment, and a third feature extracted from the time series information of the third operation segment; and a display control unit as a function realized by the computer, configured to display a shape of an object controlled by a forward operation;

wherein, when the first feature is larger than the second feature and the third feature, the recognition unit recognizes the motion of the specific part as the forward operation, and the display control unit changes the shape of the object based on a comparison result of each quantity of the first feature and the second feature, and a comparison result of each quantity of the first feature and the third feature.

2. The apparatus according to claim 1, wherein the recognition unit recognizes the motion of the specific part by comparing a quantity of the first feature with a quantity of the second feature, and by comparing the quantity of the first feature with a quantity of the third feature.

3. The apparatus according to claim 1, wherein, when the first feature is smaller than the second feature and the third feature, the recognition unit recognizes the motion of the specific part as the forward operation.

4. The apparatus according to claim 1, wherein the display control unit changes the shape of the object based on each quantity of the first feature, the second feature and the third feature.

5. The apparatus according to claim 1, wherein the first feature, the second feature and the third feature, are at least one of a movement velocity, a movement distance, and an absolute value of an acceleration of the specific part.

6. The apparatus according to claim 1, wherein the first feature, the second feature and the third feature, are a value changed by a relative position of the specific part from a predetermined basis position and the movement direction.

7. A method for recognizing a gesture, comprising:

acquiring time series information related to a position or a size of a specific part of a user's body;

detecting a movement direction of the specific part from the time series information;

detecting a plurality of operation segments each segmented by two of a start point, a turning point and an end point of the movement direction in time series order;

specifying a first operation segment to be recognized, a second operation segment following the first operation segment, and a third operation segment preceding the first operation segment among the plurality of operation segments;

recognizing a motion of the specific part in the first operation segment by using a first feature extracted from the time series information of the first operation segment, a second feature extracted from the time series information of the second operation segment, and a third feature extracted from the time series information of the third operation segment; and displaying a shape of an object controlled by a forward operation;

wherein, when the first feature is larger than the second feature and the third feature, the recognizing comprises recognizing the motion of the specific part as the forward operation, and the displaying comprises changing the shape of the object based on a comparison result of each quantity of the first feature and the second feature, and a comparison result of each quantity of the first feature and the third feature.

8. A non-transitory computer readable medium for causing a computer to perform a method for recognizing a gesture, the method comprising:

acquiring time series information related to a position or a size of a specific part of a user's body;

detecting a movement direction of the specific part from the time series information;

detecting a plurality of operation segments each segmented by two of a start point, a turning point and an end point of the movement direction in time series order;

specifying a first operation segment to be recognized, a second operation segment following the first operation segment, and a third operation segment preceding the first operation segment among the plurality of operation segments;

recognizing a motion of the specific part in the first operation segment by using a first feature extracted from the time series information of the first operation segment, a second feature extracted from the time series information of the second operation segment, and a third feature extracted from the time series information of the third operation segment; and displaying a shape of an object controlled by a forward operation;

wherein, when the first feature is larger than the second feature and the third feature, the recognizing comprises recognizing the motion of the specific part as the forward operation, and the displaying comprises changing the shape of the object based on a comparison result of each quantity of the first feature and the second feature, and a comparison result of each quantity of the first feature and the third feature.

\* \* \* \* \*